United States Patent
Faska et al.

(10) Patent No.: US 8,184,643 B2
(45) Date of Patent: May 22, 2012

(54) DEVICE, SYSTEM, AND METHOD FOR TRANSPORTING DATA USING COMBINED BROADBAND AND LEGACY NETWORK INFRASTRUCTURES

(75) Inventors: Thomas S. Faska, Brookline, NH (US); Peter J. Kelly, Wakefield, MA (US)

(73) Assignee: Ciena Corporation, Linthicum, MD (US)

( * ) Notice: Subject to any disclaimer, the term of this patent is extended or adjusted under 35 U.S.C. 154(b) by 926 days.

(21) Appl. No.: 11/226,019

(22) Filed: Sep. 14, 2005

(65) Prior Publication Data
US 2007/0076746 A1    Apr. 5, 2007

(51) Int. Cl.
H04L 12/28    (2006.01)
(52) U.S. Cl. .......................... 370/400; 370/411
(58) Field of Classification Search ............ 370/400, 370/401, 411, 463; 725/129
See application file for complete search history.

(56) References Cited

U.S. PATENT DOCUMENTS

| | | |
|---|---|---|
| 4,748,638 A | 5/1988 | Friedman et al. |
| 5,499,047 A | 3/1996 | Terry et al. |
| 5,528,582 A | 6/1996 | Bodeep et al. |
| 5,745,837 A | 4/1998 | Fuhrmann |
| 5,754,941 A | 5/1998 | Sharpe et al. |
| 5,765,097 A | 6/1998 | Dail |
| 5,774,458 A | 6/1998 | Williamson |
| 5,805,586 A | 9/1998 | Perreault et al. |
| 5,812,786 A | 9/1998 | Seazholtz et al. |
| 5,822,677 A | 10/1998 | Peyrovian |
| 5,835,125 A | 11/1998 | Bhagavath |
| 5,841,468 A | 11/1998 | Wright |
| 5,864,672 A | 1/1999 | Bodeep et al. |
| 5,864,748 A | 1/1999 | Dail |
| 5,878,177 A | 3/1999 | Karasan et al. |
| 5,878,325 A | 3/1999 | Dail |
| 5,884,024 A | 3/1999 | Lim et al. |
| 5,917,822 A | 6/1999 | Lyles et al. |
| 5,922,049 A | 7/1999 | Radia et al. |
| 5,953,338 A | 9/1999 | Ma et al. |
| 5,959,658 A | 9/1999 | Gnauck et al. |
| 5,963,561 A | 10/1999 | Lu |
| 5,963,844 A | 10/1999 | Dail |
| 5,982,554 A | 11/1999 | Goldstein et al. |
| 6,011,548 A | 1/2000 | Thacker |
| 6,052,375 A | 4/2000 | Bass et al. |

(Continued)

FOREIGN PATENT DOCUMENTS

WO    WO-99/22528    5/1999

(Continued)

OTHER PUBLICATIONS

Zhang, "Proposal of free space optical mesh network architecture for broadband access," 2002 IEEE International Conference on Communications, Conference Proceedings, New York, NY, Apr. 28-May 2, 2002.

*Primary Examiner* — Robert Wilson
*Assistant Examiner* — Brian O Connor
(74) *Attorney, Agent, or Firm* — Clements Bernard PLLC; Christopher L. Bernard; Lawrence A. Baratta, Jr.

(57) ABSTRACT

The invention relates generally to data communications using multiple data networks to transport data to one or more end user devices.

42 Claims, 10 Drawing Sheets

CATV Optical Trunk Overlay Topology

U.S. PATENT DOCUMENTS

| | | | |
|---|---|---|---|
| 6,061,330 A | 5/2000 | Johansson | |
| 6,064,805 A | 5/2000 | McCrory et al. | |
| 6,073,178 A | 6/2000 | Wong et al. | |
| 6,075,787 A | 6/2000 | Bobeck et al. | |
| 6,088,729 A | 7/2000 | McCrory et al. | |
| 6,104,700 A | 8/2000 | Haddock et al. | |
| 6,108,331 A * | 8/2000 | Thompson | 370/352 |
| 6,137,780 A | 10/2000 | Darcie et al. | |
| 6,137,793 A | 10/2000 | Gorman et al. | |
| 6,173,312 B1 | 1/2001 | Atarashi et al. | |
| 6,188,698 B1 | 2/2001 | Galand et al. | |
| 6,230,203 B1 | 5/2001 | Koperda et al. | |
| 6,331,987 B1 | 12/2001 | Beser | |
| 6,345,296 B1 | 2/2002 | McCrory et al. | |
| 6,381,242 B1 | 4/2002 | Maher, III et al. | |
| 6,408,006 B1 | 6/2002 | Wolff | |
| 6,442,138 B1 | 8/2002 | Yin et al. | |
| 6,504,819 B2 | 1/2003 | Fowler et al. | |
| 6,587,479 B1 * | 7/2003 | Bianchi et al. | 370/487 |
| 6,588,016 B1 | 7/2003 | Chen et al. | |
| 6,604,147 B1 | 8/2003 | Woo | |
| 6,633,540 B1 | 10/2003 | Raisanen et al. | |
| 6,643,694 B1 | 11/2003 | Chernin | |
| 6,693,878 B1 | 2/2004 | Daruwalla et al. | |
| 6,693,912 B1 | 2/2004 | Wang | |
| 6,697,864 B1 | 2/2004 | Demirtjis et al. | |
| 6,704,789 B1 | 3/2004 | Ala-Laurila et al. | |
| 6,728,208 B1 | 4/2004 | Puuskari | |
| 6,731,639 B1 | 5/2004 | Ors et al. | |
| 6,738,641 B1 * | 5/2004 | Elsasser | 455/523 |
| 6,742,187 B1 | 5/2004 | Vogel | |
| 6,751,417 B1 | 6/2004 | Combs et al. | |
| 6,768,743 B1 | 7/2004 | Borella et al. | |
| 6,785,236 B1 | 8/2004 | Lo et al. | |
| 6,788,681 B1 | 9/2004 | Hurren et al. | |
| 6,799,220 B1 | 9/2004 | Merritt et al. | |
| 6,804,776 B1 | 10/2004 | Lothberg et al. | |
| 6,839,321 B1 | 1/2005 | Chiruvolu | |
| 6,847,609 B1 | 1/2005 | Sarnikowski et al. | |
| 6,862,286 B1 | 3/2005 | Tams et al. | |
| 6,865,185 B1 | 3/2005 | Patel et al. | |
| 6,880,020 B1 * | 4/2005 | Rubinstein et al. | 709/250 |
| 6,948,000 B2 | 9/2005 | Desai et al. | |
| 7,013,087 B2 * | 3/2006 | Suzuki et al. | 398/115 |
| 7,023,809 B1 * | 4/2006 | Rubinstein et al. | 370/241 |
| 7,027,431 B1 * | 4/2006 | Thompson | 370/352 |
| 7,072,360 B2 | 7/2006 | Dravida et al. | |
| 7,085,533 B1 * | 8/2006 | Rubinstein et al. | 455/41.2 |
| 7,171,121 B1 * | 1/2007 | Skarica et al. | 398/67 |
| 7,212,520 B2 * | 5/2007 | Luciano, III | 370/352 |
| 7,359,392 B2 * | 4/2008 | Bianchi et al. | 370/401 |
| 7,748,023 B2 * | 6/2010 | Weinstein et al. | 725/127 |
| 7,937,738 B1 * | 5/2011 | Gurantz | 725/118 |
| 7,941,559 B2 * | 5/2011 | Adcox et al. | 709/245 |
| 2001/0030970 A1 | 10/2001 | Wiryaman et al. | |
| 2001/0053149 A1 | 12/2001 | Mo et al. | |
| 2002/0007360 A1 | 1/2002 | Hawkinson | |
| 2002/0059634 A1 | 5/2002 | Terry et al. | |
| 2002/0093966 A1 * | 7/2002 | Liva et al. | 370/400 |
| 2003/0095562 A1 | 5/2003 | Liu et al. | |
| 2004/0081180 A1 * | 4/2004 | De Silva et al. | 370/402 |
| 2004/0172658 A1 * | 9/2004 | Rakib et al. | 725/120 |
| 2005/0125837 A1 | 6/2005 | Farmer | |

FOREIGN PATENT DOCUMENTS

| | | |
|---|---|---|
| WO | WO 03/061330 A2 | 7/2003 |

* cited by examiner

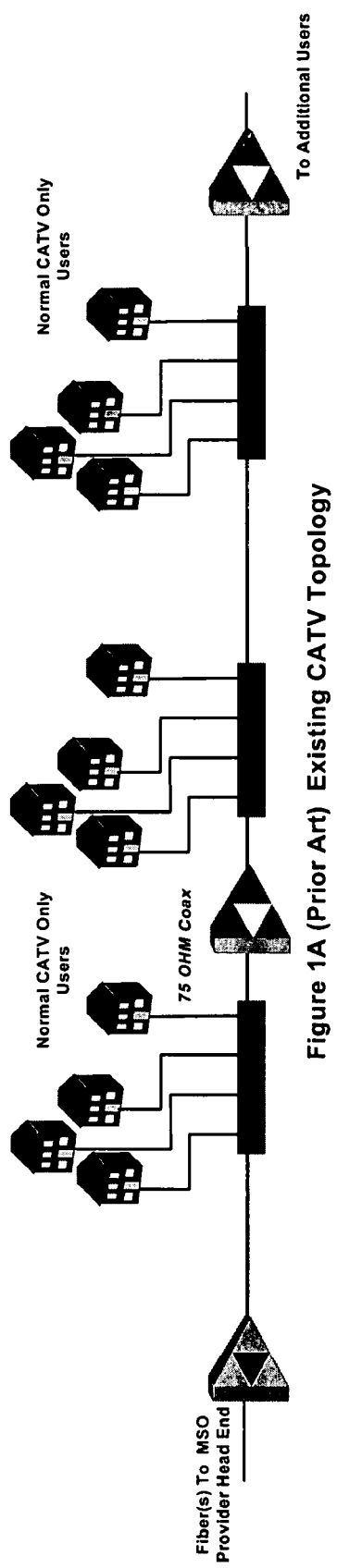
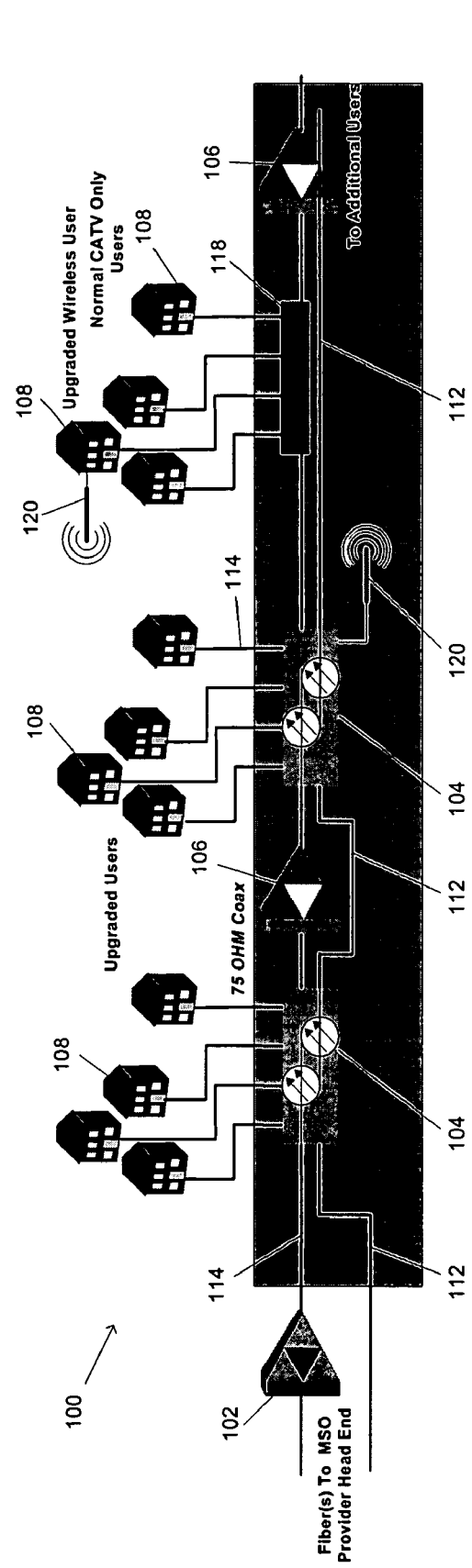
Figure 1A (Prior Art) Existing CATV Topology
Figure 1B CATV Optical Trunk Overlay Topology

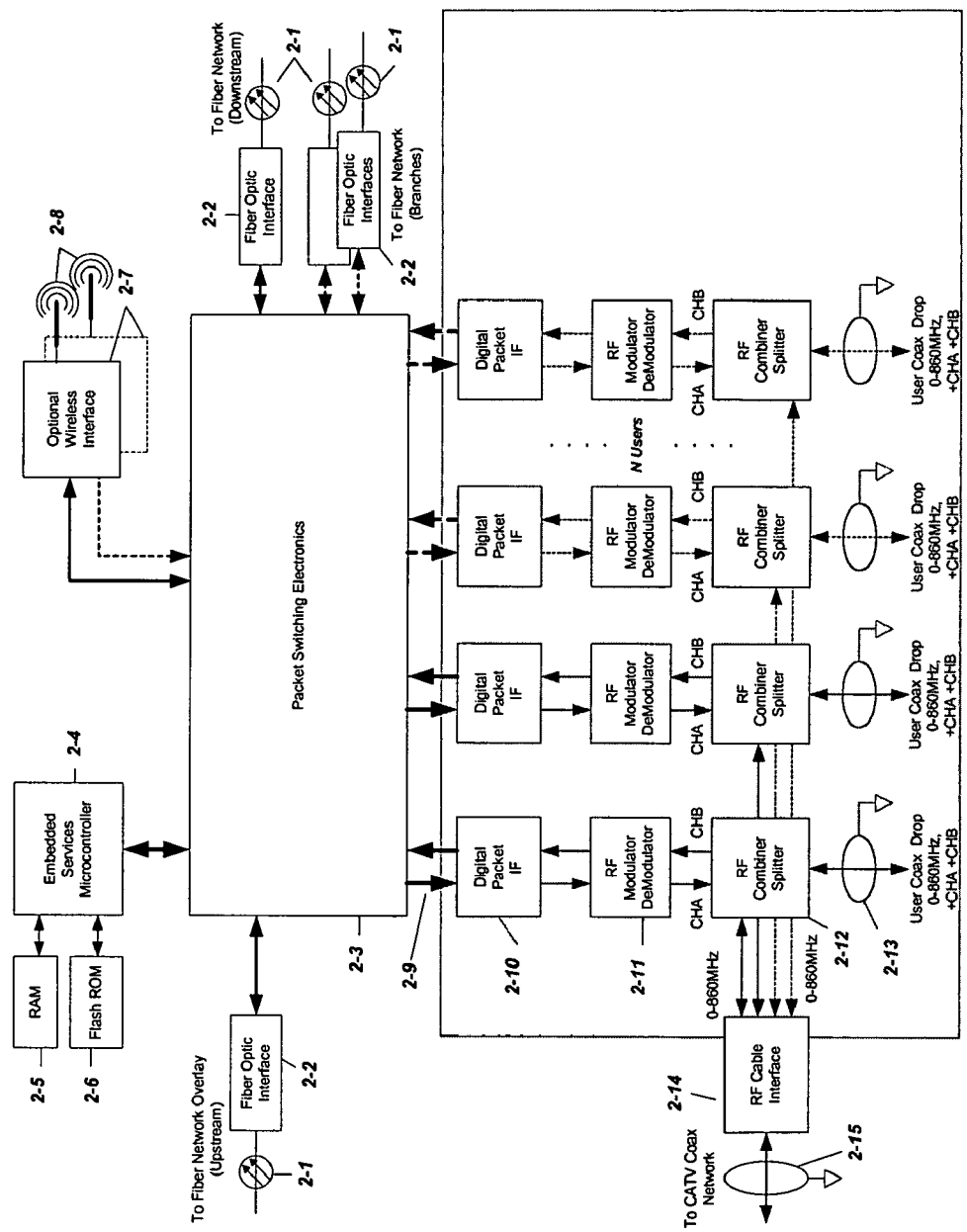
Figure 2 Architectural Block Diagram

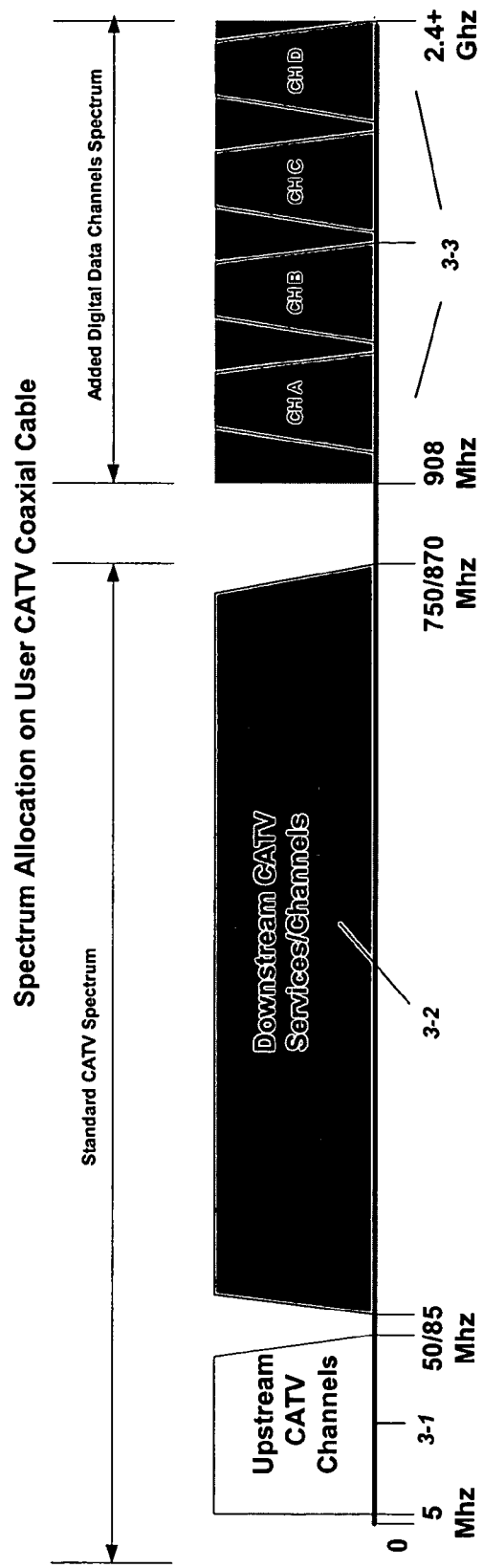
Figure 3 RF Spectrum Allocation of User Drop Coaxial Cable

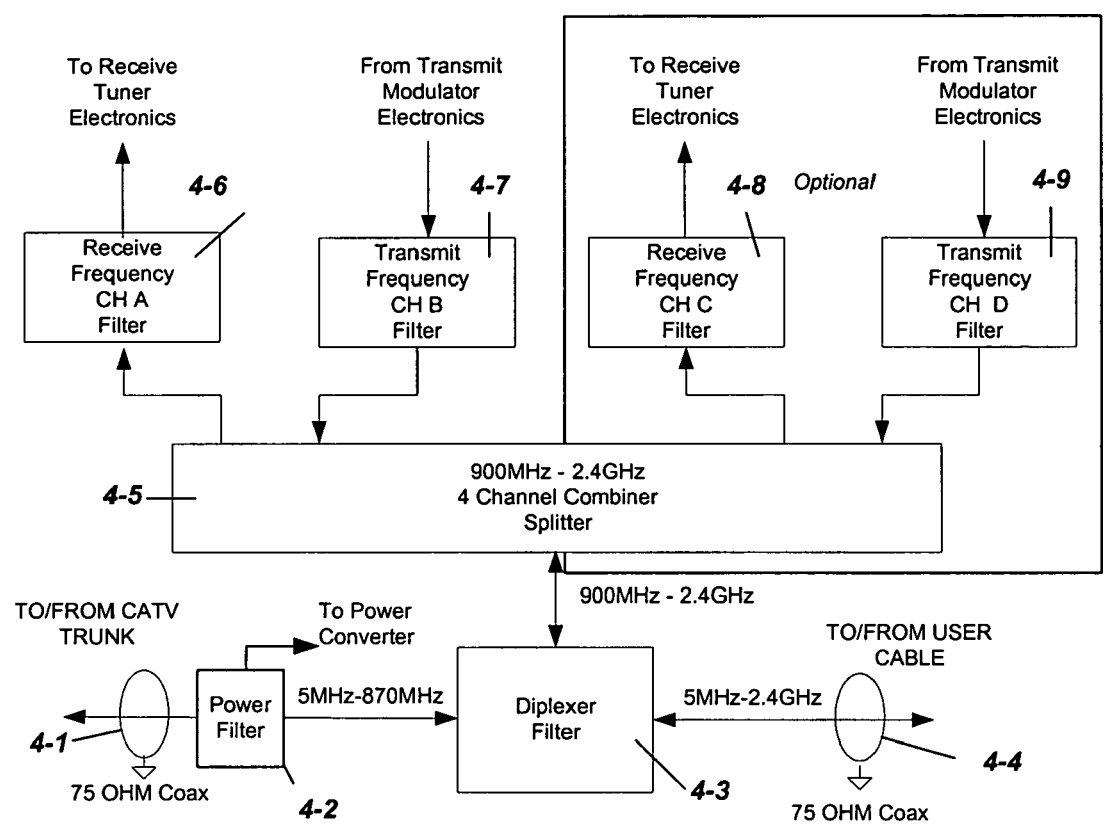
Figure 4 RF CATV and RF Data Combination Coaxial Cable

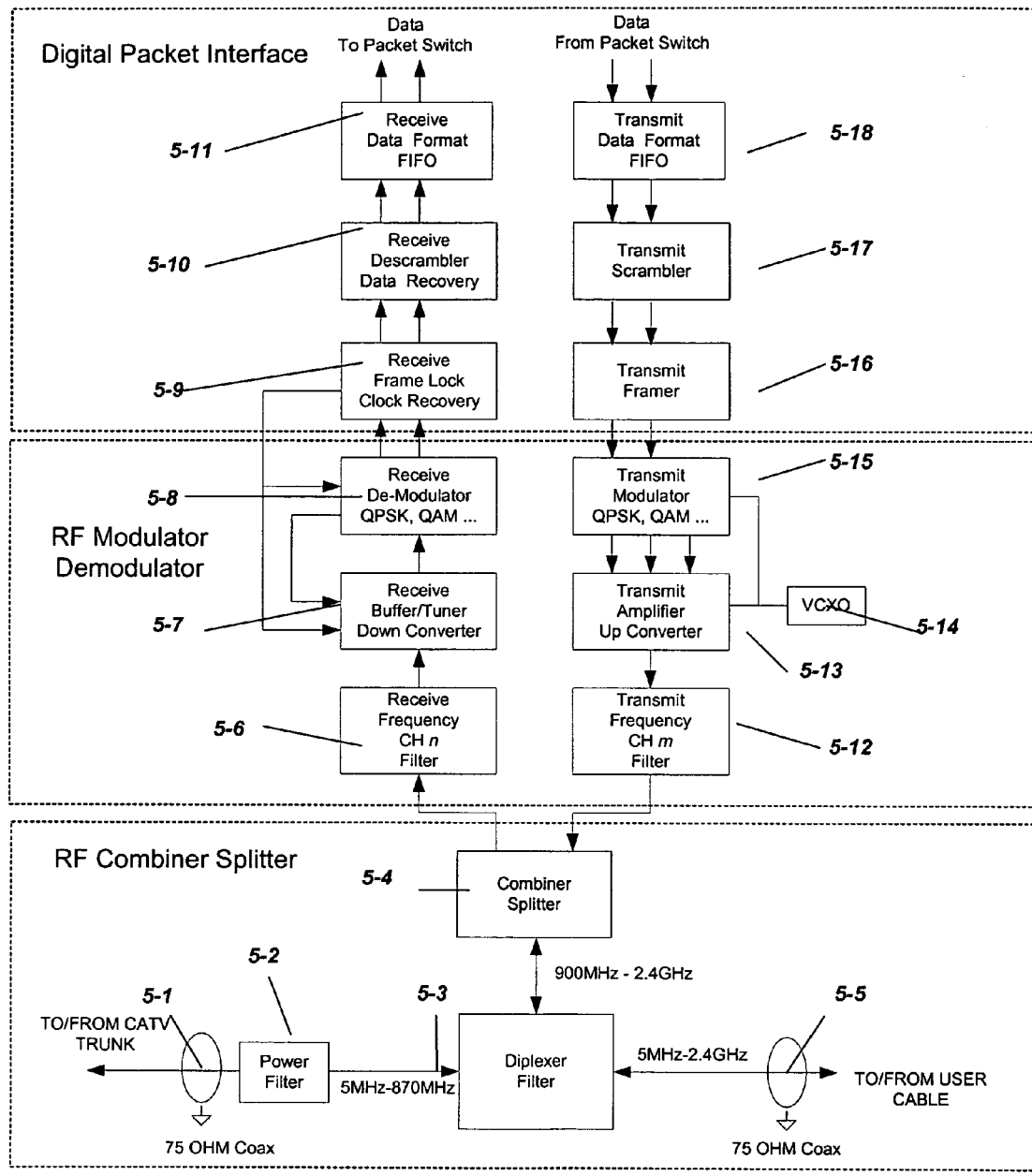
Figure 5 Transport Data Paths Diagram Using Separate Drop RX/TX Channels

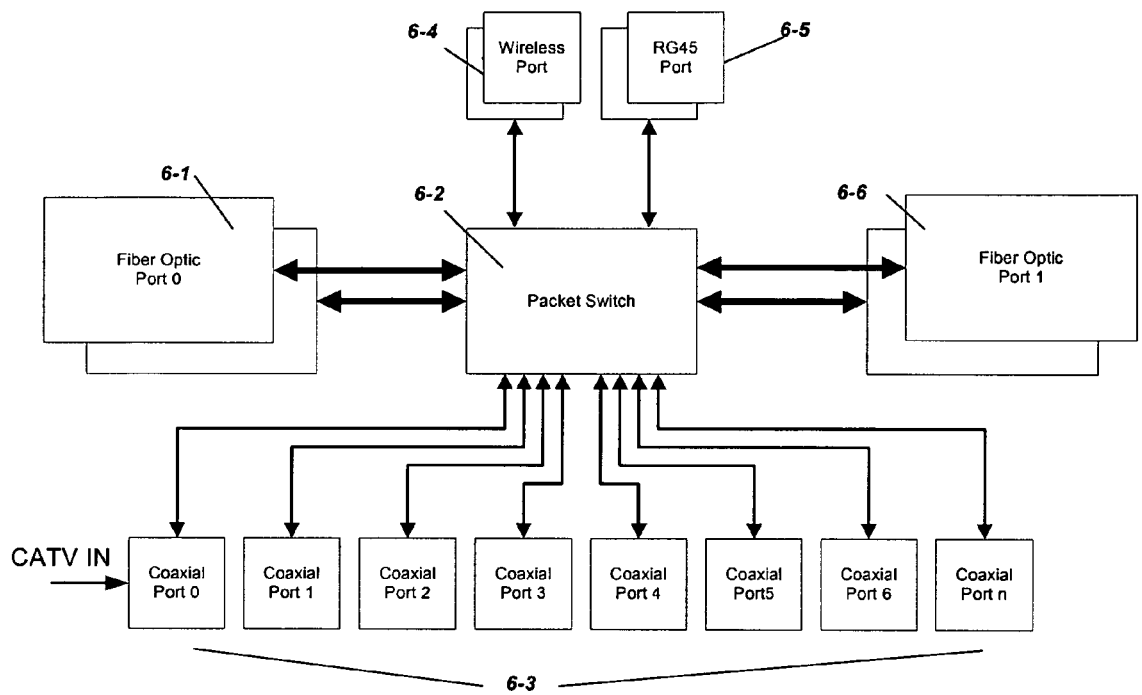
Figure 6 Data Flow Diagram

Fiber Optic Port Block Diagram
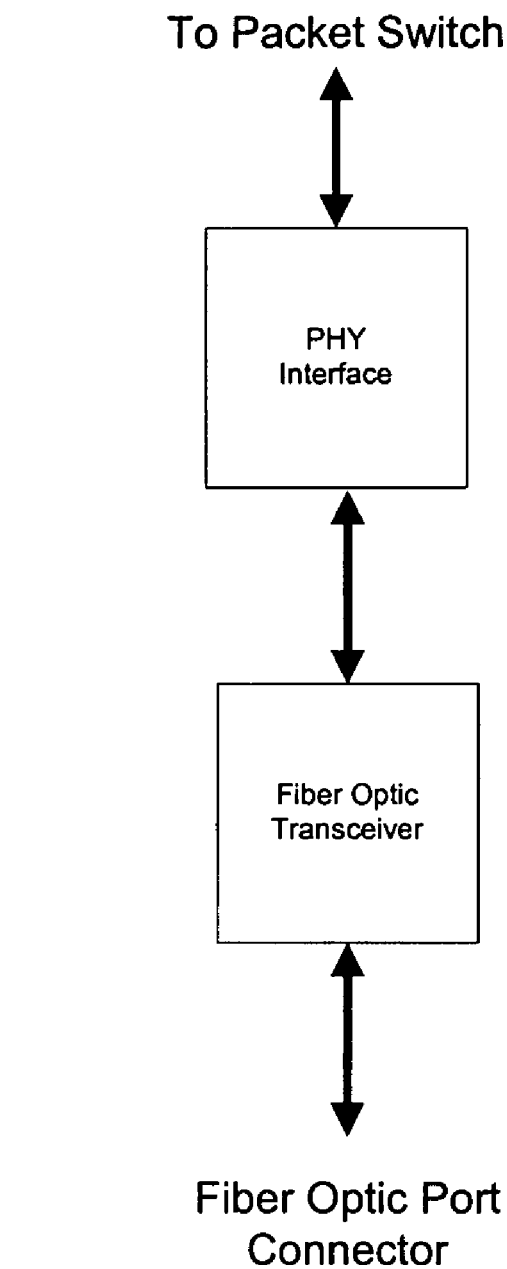
Figure 7  Fiber Optic Port Block Diagram

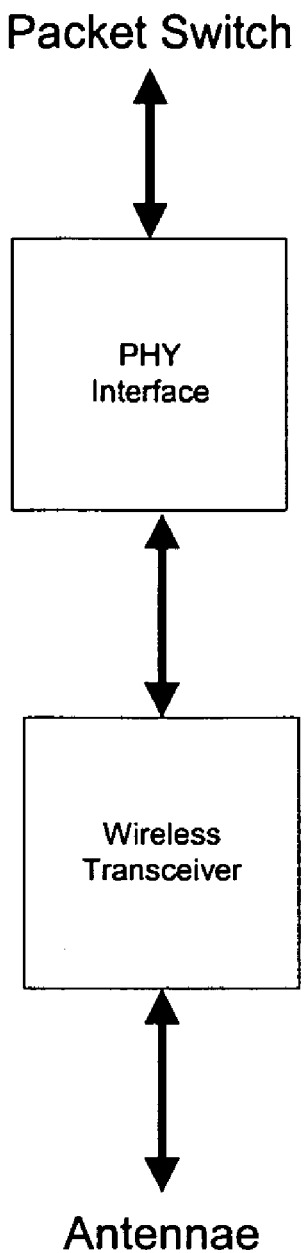
Figure 8  Wireless Port Block Diagram

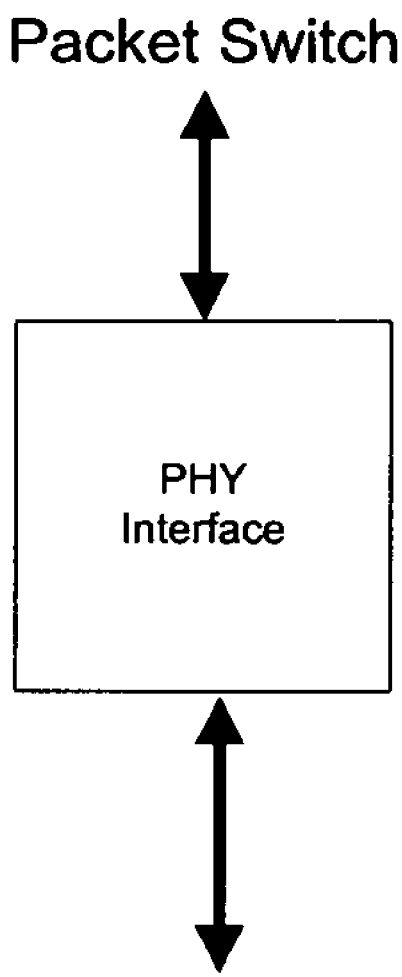
Figure 9 RJ45 Port Block Diagram

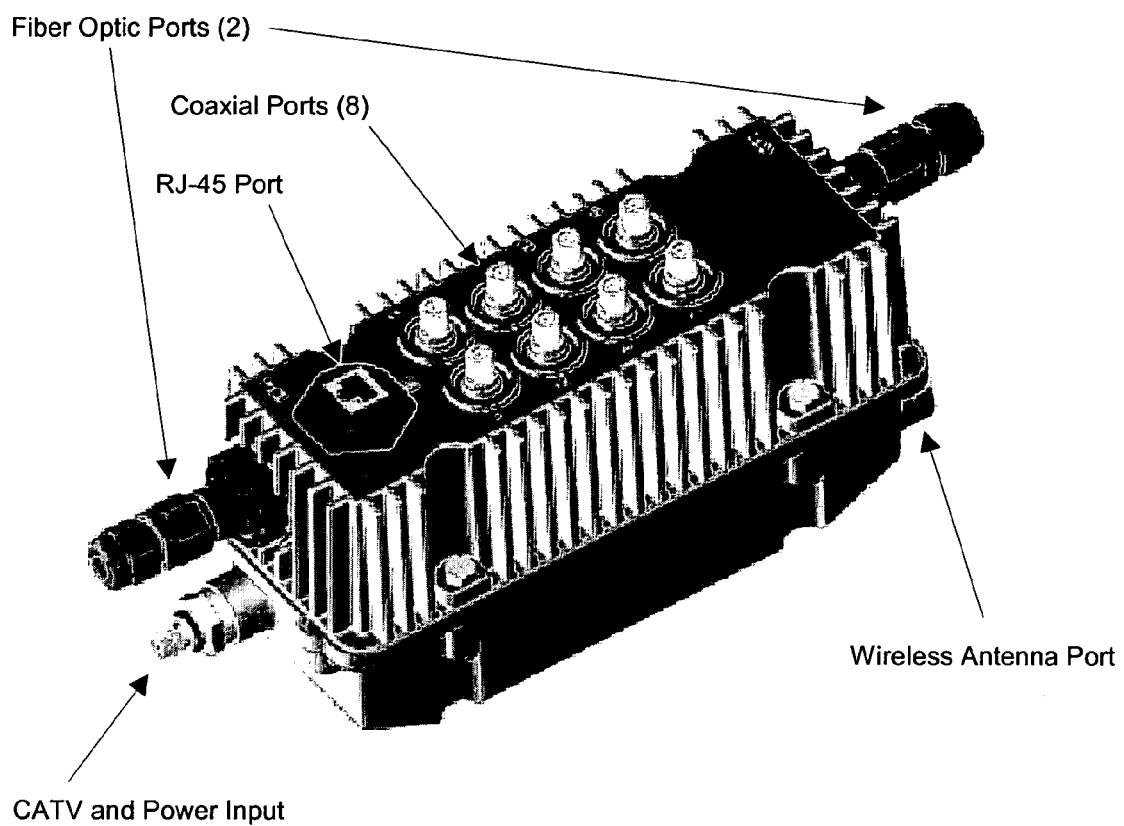
Figure 10 Depiction of Invention

DEVICE, SYSTEM, AND METHOD FOR TRANSPORTING DATA USING COMBINED BROADBAND AND LEGACY NETWORK INFRASTRUCTURES

FIELD OF THE INVENTION

The invention relates generally to systems, methods and devices for data network communications. More particularly, in various embodiments, the invention relates to devices and systems and related methods for transporting data using broadband and legacy network infrastructures.

BACKGROUND

For quite a number of years, data including voice, video and other information have been converted to digital form and transferred over digital networks from content providers to the users or subscribers. The most obvious example of this "digital conversion" of voice, video, and other data can be seen in the world-wide-web (WWW) or Internet. As digital content becomes more rich and complex, the required size of the data transfers have increased from kilobytes to megabytes and, further, to gigabytes. Hence, there is a need for greatly increased data access speeds between content producers and/or providers and consumers and/or end users.

Currently most businesses and residences use hardwired connections from either a local telecommunications provider, also known as a Local Exchange Carrier (LEC) or from a local cable network provider, also known as a Multi-System Operator (MSO). Certain businesses and residences also receive video and other data from direct broadcast satellites (DBS).

LECs primarily use circuit-switched networks to provide voice and data connections to customers with data rate of 64 kb/s for single line, 1.544 Mb/s for a T-1, and 44.736 Mb/s for a T-3 line.

Certain regional Bell operating companies (RBOC) have begun laying fiber optic cables directly to, or in close proximity to, commercial buildings and residences to allow for increased speeds and reduced operating costs. This is generally referred to as fiber to the premise (FTTP). These newer fiber optic systems are sometimes passive optical networks (PON) where there are no active devices between the final endpoint and the head end where all the fibers terminate. The distance from an aggregation point to an endpoint can be tens of kilometers. To reduce the total number of fibers required, these networks typically use wavelength division multiplexing (WDM) to split one "feeding" fiber with a number of endpoints.

PON networks are designed to carry voice, video and other data traffic bi-directionally from an aggregation point or head end to an endpoint. The networks are typically set up for asymmetric data flow where more data is transmitted from the aggregation pint to the endpoint (downstream) than from the endpoint to the aggregation point (upstream). End user data speeds are typically 5-30 Mb/s downstream and 1-15 Mb/s upstream.

MSOs typically utilize hybrid fiber and coax (HFC) plants to send voice, video and other data to customer endpoints. These systems bring digitized voice, video and other data over one or more fiber optic cables that are tens of kilometers in length to a fiber node (FN). The data is typically converted to analog RF or digital data, e.g., Quadrature Amplitude Modulated (QAM) encoded digital data, and relayed to commercial and residential premises. The FN typically serves about 500 endpoints, but the capacity can vary from less than 100 to over 1000. The video signal is converted to both analog and digital RF for reception by a cable-ready television or set-top box. The voice and other data signals are transmitted using the data over cable system interface specification (DOCSIS) to and from a cable modem. MSOs typically transfer data in an asymmetric manner in their networks. For example, DOCSIS data rates typically range from 1-10 Mb/s for downstream communications and 0.25-2 Mb/s upstream communications. FIG. 1A is conceptual block diagram of a portion of a prior art cable TV network downstream of a fiber node.

DBS networks typically use one or more satellites in geostationary orbit to broadcast video and certain other data to small dish receivers. While DBS networks can transmit data in a bidirectional manner, the capacity is typically limited to less then 1.5 Mb/s downstream and less than 0.5 Mb/s upstream. In addition to the relatively slow data rates, there is considerable latency incurred because of the round trip time from geostationary orbit. With this latency, real time games and voice communications are not practical.

The physical links to homes and businesses in certain regions are predominantly twisted-pair copper lines for telecommunications and coaxial cable for video data. The current LEC and MSO infrastructure does not have the capability or capacity to meet the future bandwidth requirements needed for multimedia data services that combine voice, video and other forms of data. While certain telecommunications providers are performing FTTP infrastructure upgrades to address the problem of limited data bandwidth, cost of such an upgrade is unacceptably high.

Accordingly, there is a need to significantly improve data rates and/or data bandwidth to business, residential customers, and/or end users using existing cable and/or telecommunications infrastructure.

SUMMARY

The invention, in various embodiments, addresses deficiencies in the prior art by providing systems, methods and devices for transporting data to an end user device using a combination of broadband and legacy network infrastructures or mediums to support enhanced data throughput to the end user.

By combining legacy and broadband data mediums, in certain embodiments, the invention is, for example, capable of using the existing coax or twisted-pair copper lines, bandwidth efficient, robust and scalable, capable of expanding trunk and drop bandwidths from 100 Mb/s to beyond 10 Gb/s, minimally disturbing to the existing MSO or LEC system, capable of using bandwidth and spectrum outside what the existing cable networks (CATV plants) currently use, capable of providing quality of service (QoS) guarantees based on the type of data flow or service, efficiently deployed, and a relatively low cost alternative to FTTP deployment.

Legacy data networks are data networks that include standard infrastructure components, employ standard data protocols, and use standard physical mediums. For example, an MSO legacy data network typically includes an HFC infrastructure having a regional cable head-end, one or more distribution hubs, multiple FNs, and multiple local coaxial-cable taps for end user devices. A distribution hub may include a cable modem termination system (CMTS). The MSO legacy data network typically employs the DOCSIS protocol. The MSO legacy network uses a fiber optic cable medium upstream of a FN and a coaxial cable medium downstream of a FN. The legacy data rates typically range from 1-10 Mbps for downstream communications and 0.25-2 Mb/s upstream communications.

The public switched telephone network (PSTN) employs legacy circuit-switched local loop connections to end-users. To provide certain data services, the PSTN may employ legacy data protocols such as DSL. Legacy DSL data rates are about 1.5-6.1 Mbps downstream and 16-834 Kbps duplex. The legacy physical transport medium, e.g., physical layer, at least at the local loop is typically twisted pair copper wires of a certain gage.

Broadband data network are data networks including links capable of supporting a relatively higher data rates than an existing legacy network data rate. For example, if the standard legacy data rate over coaxial cable is 1-10 Mbps, a data network capable of transmitting data at a rate above 10 Mbps may be considered a broadband data network. If the standard data rate over the PSTN local loop is 834 Kbps, then a network capable of transmitting data at a rate above 834 Kbps is a broadband data network. The broadband transport medium, for example, may be fiber optic cable.

The broadband data network and legacy data network may be sub-networks of a combined data network. For example, the MSO may deploy a broadband optical data network as a logical and/or physical overlay on an existing legacy coaxial data network.

In one aspect, the invention includes a device or apparatus with the capability to perform certain methods and/or functions that enhance data throughput to end users data devices. In another aspect, the invention employs a system and architecture to manage a plurality of such devices. The device takes as input fiber-fed data channels, switches these data channels to a plurality of coax outputs, and the coax outputs combine onto a coaxial cable the legacy CATV signals in sub 1 GHz spectrum and switch-fed data in the greater than (>) 860 MHz spectrum.

The invention, in certain embodiments, makes use of an overlay topology of optical trunk fiber cabling to supplement standard CATV coaxial cable trunks and provides a mechanism for combining signals from these two cables mediums to use existing coaxial "drop" cables that connect the trunks to an end user device within a customer premises. The invention, in another embodiment, provides multiple coaxial cable access points (user drops), an optional wireless transceiver, and at least one optional direct Ethernet connection. The drop cables enter a home or business, and then the legacy CATV data signals are separated apart from the overlay broadband, e.g., fiber optic, data signals. The CATV data signal channels are directed to standard, legacy coaxial cable devices such as, without limitation, set-top boxes, televisions, digital video recorders (DVR), and cable modems. The newly added data channels may be directed to the same or a separate modem where the data signal is converted into standard networking protocols. Unlike other legacy data signals, e.g. DOCSIS-based data signals, these data signals may reside in channels and/or bands within the existing coaxial cable that are outside (above) the standard CATV bandwidth and/or spectrum.

One exemplary implementation of the invention includes a data distribution device with two bi-directional fiber optic connections, one coaxial cable input, eight coaxial cable outputs, a IEEE 802.11 a/b/g or 802.16 wireless network antenna connection and an RJ45 connector. The data distribution device includes a multi-port switch, two fiber optic transceivers, a power supply, RF modems for converting data from the switch to RF modulated signals and the inverse, electronics such as a combiner/splitter for combining at least one RF data signal with a legacy CATV signal or remove one or more RF data signals from a combined RF modulated data signal. The data distribution device may include electronics, circuits, software, hardware, and/or functions that implement one or more wireless communications standard protocols to enable wireless communications. The data distribution device may include a CPU and software for setup monitoring and device control.

In certain embodiments, the data distribution device sends and receives data via a plurality of data ports. The data ports may include, without limitation, one or more legacy coaxial cable ports, one or more broadband fiber optic data ports, one or more wireless data ports, and one or more Ethernet data ports. The data may include, without limitation, voice, video, audio, data streams, data packets, circuit-switched, packet-switch, connection-oriented, and/or connectionless data. The data may be encapsulated in a protocol such as IP.

The data ports, in one embodiment, include two fiber optic ports, eight coaxial ports, an RJ45 port and a wireless data port. The data ports may be configured by the local CPU based, at least in part, on information obtained from a central registry or command authority, e.g. a topology/policy server. All of the data ports may be enabled, disabled, and provisioned from the central registry. Data from any port may be sent to an internal packet switch, which then determines where to route the data packets. The on-board processor may examine the packet and alter the priority or quality of service information before the data packet is then sent out from the switch to the appropriate data port.

In another embodiment, two of the fiber optic data ports form a high-speed data trunk. These broadband data ports may be connected via a fiber optic cable medium to other data distribution devices in a chain, or to another high-speed network or router. While the two broadband fiber-optic ports are identical and capable of symmetric communications, the broadband port connected to the upstream direction may be considered the input (or upstream) broadband data port and the other fiber optic port may be considered the output (or downstream) broadband data port. Additional fiber ports may be present for expansion, redundancy or to create a "mesh" topology. Furthermore, a single broadband data port may provide both upstream and downstream broadband data communications where the broadband network is configured in a ring topology.

In one embodiment, an RJ45 connection includes a standard Ethernet data port, allowing Ethernet-compliant devices to connect with the data distribution device. Provided that the port is enabled and provisioned to interact with the connected device, the data distribution device may enable a high-speed Ethernet connection. The wireless port implements one of many standard wireless protocols including, for example, without limitation, the family of IEEE 802.11 protocols. If the wireless port is enabled and provisioned to interact with users, the data distribution device may provide a high-speed and/or broadband wireless data connection to an end user device.

In another embodiment, the coaxial data ports use a transceiver including a transmit channel modulator and receive channel demodulator and associated RF frequency up-converter and down-converter to insert and extract the data to and from an RF modulated signal. The legacy coaxial cable ports also provide the necessary amplifier and filter electronics, including at least one diplexer, to combine the a data signal from the data switch with the legacy CATV signal and send the combined RF modulated signal from the data distribution device to an endpoint and/or end user device.

In one aspect, the invention includes a data distribution device having at least one legacy data port in communication with at least one end user device via a first network transport medium, at least one broadband data port in communication with a second network transport medium, at least one broadband transceiver, in communication with at least one broadband data port, for sending and receiving broadband data signals, and at least one legacy transceiver, in communication with at least one legacy data port, for sending and receiving RF modulated data signals.

The data distribution device may also include at least one converter, in communication with at least one legacy transceiver. The converter may be configured to i) convert RF modulated data signals into data packets and ii) convert data packets into RF modulated data signals. The data distribution device may include a data switch, in communications with at least one converter and at least one broadband transceiver, for inspecting and routing data packets between data ports.

The data distribution device may include at least one combiner/splitter, in communication with at least one legacy transceiver. The combiner/splitter, e.g., diplexer, may be configured to combine a first RF modulated data signal in a first frequency band with a second RF modulated data signal in a second frequency band and extract at least one of the first and second RF modulated data signals from a single RF modulated data signal including the combined RF modulated data signals in the first and second frequency bands.

In another aspect, the invention includes a communications system having a plurality of the foregoing data distribution devices. The system may include a legacy data network, a plurality of end user devices in communication with the legacy data network, and a broadband data network. The plurality of data distribution devices may be communication with the legacy and broadband data networks to enable enhanced data communications from a service provider to end user.

In yet another aspect, the invention includes a method of transmitting data over multiple networks. The method includes sending to a data distribution device over a first network a first legacy data signal, sending to a data distribution device over a second network a first broadband data signal, receiving at the data distribution device the legacy data signal and the broadband data signal, determining the intended destination of the legacy and broadband data signals, and then sending, from the data distribution device, at least one of the data signals to at least one destination device via at least one of the first and second networks.

BRIEF DESCRIPTION OF THE DRAWINGS

These and other features and advantages of the invention will be more fully understood by the following illustrative description with reference to the appended drawings, in which like elements are labeled with like reference designations and which may not be to scale.

FIG. 1A is conceptual block diagram of a portion of a prior art cable TV network downstream of a fiber node.

FIG. 1B is a conceptual block diagram of a portion of a cable TV network downstream of a fiber node including a data distribution device, e.g., optical tap, according to an illustrative embodiment of the invention.

FIG. 2 is a conceptual block diagram of a data distribution device according to an illustrative embodiment of the invention.

FIG. 3 is graph showing the location within an RF spectrum of the legacy cable TV bands and added digital data bands according to an illustrative embodiment of the invention.

FIG. 4 is a conceptual block diagram of a data distribution device capable of transmitting and receiving RF modulated data signals in bands A-D and the legacy cable TV bands shown in FIG. 3 according to an illustrative embodiment of the invention.

FIG. 5 is another conceptual block diagram of a data distribution device including the combiner/splitter, legacy cable transceiver, and converter elements according to an illustrative embodiment of the invention.

FIG. 6 is a conceptual block diagram of a data distribution device showing the various packet data flows according to an illustrative embodiment of the invention.

FIG. 7 is a conceptual block diagram of a broadband fiber optic data port of a data distribution device according to an illustrative embodiment of the invention.

FIG. 8 is a conceptual block diagram of a wireless data port of a data distribution device according to an illustrative embodiment of the invention.

FIG. 9 is a conceptual block diagram of an Ethernet data port of a data distribution device according to an illustrative embodiment of the invention.

FIG. 10 is a perspective view of a data distribution device according to an illustrative embodiment of the invention.

ILLUSTRATIVE DESCRIPTION

The invention, in various embodiments, provides systems, methods and devices for transporting data to an end user device using a combination of broadband and legacy network infrastructures and/or mediums to support enhanced data throughput to the end user.

In certain embodiments, the invention includes a data distribution device that contains features and electronics to allow the merging of high-speed and/or broadband optical fiber data traffic with normal and/or legacy cable television data traffic. The data distribution device enhances the architecture of service provider data network, enabling the service provider to provide merged video, voice and other data services in a network-managed environment while preserving existing cable TV (CATV) services and infrastructure.

The invention, in one embodiment, advantageously uses a fiber optic medium to provide an economical parallel and shared resource fiber trunk to an end user tap including a data distribution device. Along with the broadband fiber optic data connection, the data distribution device uses the existing legacy bandwidth from an existing legacy coaxial cable connection of an MSO head-end, which reduces the overall complexity of data distribution services as compared to point-to-point fiber optic topologies. This fiber optic cable medium, and/or network, is deployed along side the existing coaxial cable medium and/or network.

FIG. 1B is a conceptual block diagram of a portion of a cable TV network 100 downstream of a fiber node 102 including a data distribution device 104, e.g., optical tap, according to an illustrative embodiment of the invention. The network 100 includes multiple RF amplifiers 106 and multiple end user devices 108. The network 100 also includes broadband optical cable links 112, coaxial cable links 114, legacy cable TV tap 118, and wireless antennas 120. The data links 112 may include a fiber optic cable medium and/or fiber optic physical layer components. According to one embodiment, the fiber optic links 112 are broadband data links relative to the coaxial cable data links 114 because of the relatively high data rates supported with respect to the legacy coaxial cable data links 114. In certain embodiments, the coaxial cable data links 114 are legacy data links because the data links 114 utilize standard, industry-defined coaxial cable medium and/or coaxial cable physical layer components, even though these data links 114 may support non-standard and out of standard spectrum data communication bands.

In one embodiment, the aggregation of broadband data links 112 forms a broadband data network including fiber optic cable and other physical layer components. In one embodiment, the aggregation of legacy coaxial cable data links 114 forms a legacy data network. In certain embodiments, each data distribution device 104 acts as any one or combination of a switch, bridge, router, and/or other interface between the broadband and legacy data networks.

In the illustrative embodiment of FIG. 1B, each data distribution device 104 includes two broadband optical data trunks that daisy chain through the device 104 and each data distribution device 104 acts as a network data switch. Services are deployed and managed for the end user devices 108 by each connected data distribution device 104. Each data distribution device 104 communicates with and works in conjunction with a customer premises data modem, e.g., end user device 108. In one embodiment, the data distribution device 104 supports various data management protocols and data formats. The data distribution device 104 may use secure industry-accepted data and control layer protocols along with mechanisms including MPLS, IP, Ethernet and SNMP.

By employing the data distribution device 104, the existing cable infrastructure is preserved, including the trunk cable, amplifiers and customer drop coaxial ports. The use of the data distribution device 104 enables upgrades to advanced services with, for example, higher data throughputs in an incremental manner, i.e., for one end user tap at a time. Thus, using a shared fiber optic overlay trunk along the path of the existing cable trunk enables the propagation of broadband capabilities to certain end user devices 108 while allowing other end user devices 108 to utilize the existing legacy infrastructure.

By using existing CATV coax cable drops or legacy ports already routed to the customer premises, the data distribution device 104 advantageously enables higher bandwidth services for end users without requiring upgrades to certain end user infrastructure and/or devices 108. Existing cable services are unaffected and the new high-speed data services can be inserted and extracted by each data distribution device 104 under control of the service provider.

In certain embodiments, the data distribution device 104 provides for expansion of the tree and branch structure of the existing legacy cable TV (CATV) network by supporting a mesh optical fiber infrastructure. For example, each data distribution device 104 may include perpendicular optical fiber ports and/or optical fiber ports that interconnect with other data distribution devices 104. A perpendicular fiber port may be a fiber port that enable a data distribution device 104 to interconnect with another data distribution device 104 that resides within another branch of a tree and branch network or with a data distribution device 104 other than one which immediately precedes or follows in a series chain and/or link.

In one embodiment, a plurality of data distribution devices 104 are interconnected via a fiber optic cable medium or network to provide a redundant and/or meshed topology. Thus, if one data distribution device 104 fails, broadband optical cable data traffic may be routed to any downstream data distribution device 104 via an alternative data distribution device 104. In another embodiment, a data distribution device 104 may include a single broadband optical cable port and be interconnected with one or more other data distribution devices 104 via an optical cable medium or network configured in a ring topology. In certain embodiments, a data distribution device 104 may include a wireless connection 120 to interface with a wireless architecture. Such a connection may enable resource sharing between wireless, broadband, and legacy data networks.

FIG. 2 is a conceptual block diagram of a data distribution device 104 according to an illustrative embodiment of the invention. The data distribution device 104 includes a fiber optic interface (2-1, 2-2), packet switch (2-3), processor (2-4), random access memory (2-5), flash ROM (2-6), wireless interface (2-7), wireless antenna (2-8), data packet channel (2-9), digital packet IF (2-10), RF modem and or transceiver (2-11), combiner/splitter (2-12), coaxial cable drop port (2-13), RF cable interface (2-14), RF coaxial cable connector (2-15), and RJ-45 connector (2-16).

In the illustrative embodiment of FIG. 2, the data distribution device 104 incorporates a combination of functions of digital data channels above the CATV spectrum along side CATV in user drops. Thus, a plurality of data distribution devices optical fiber trunk CATV overlay with plurality of included drop interface types, which allow the optical fiber trunk to act as a primary digital data transport for DSL, Ethernet, Wireless and IP user traffic. It is assumed that this traffic can include, but is not limited to, digital video, voice and data traffic and services for the end user.

In certain embodiments, the data distribution device 104 connects to the fiber optic cable(s) and/or medium 112 at an optical interface. This is assumed to be an industry standard fiber optic element, which converts the fiber optic signal to a serial digital data stream. This data, in turn, is forwarded and managed via the embedded CPU (2-4) and Packet Data Switch (2-3).

The data switch (2-3) may be capable of inspecting and routing data packets based, in part, on at least one of a packet prioritization and quality of service determination. The inspecting and routing of data packets may be based at least in part on one of the IEEE 802.1p, EEEE 802.1q, and the MPLS standard.

The fiber optic interface (2-1, 2-2) of the data distribution device 104 and associated data protocol may handle, in one embodiment, about 100 Mbit to 10 Gbit data streams using industry standard packet protocols, clocking, and data management. Data may be forwarded to and/or from the user-drop port electronics. In one embodiment, the data may be forwarded to other optical elements (2-1, 2-2) for other users along an optical fiber chain.

The fiber optic (FO) cable may be physically deployed in proximity of the coaxial cable as shown in FIG. 1. However, FO cable entry into the network may be made at any point along the trunk and can be made at multiple points for either tree and branch or mesh network topologies.

FIG. 3 is graph showing the location within an RF spectrum of the legacy cable TV bands and added digital data bands according to an illustrative embodiment of the invention when digital data and CATV are combined on user RF coaxial cable drops.

The user coaxial cable drops contain legacy RF CATV signals as well as inserted high-speed and/or broadband data RF channels. In one embodiment, there is at least one data channel supplied for combined (half-duplex) transmit and receive data or two data channels for separated (full-duplex) transmit and receive data. In other embodiments, multiple data channels and expanded ports may be implemented.

In certain embodiments, the data distribution device 104 uses a combination of CATV and out-of-band data channels and/or spectrum above the deployed CATV band. There may be a plurality of channels, used for either upstream (transmit) and/or downstream (receive) data transport. FIG. 3 provides exemplary spectrum characteristics of the user drop RF signals where the normal CATV spectrum is allocated and split as upstream (3-1) and downstream (3-2). FIG. 3 shows at least one exemplary embodiment where four channels (3-3) are allocated above the spectrum between 908 MHz and 2.4 GHz. The number of channels and their frequencies may vary with the specific implementation adopted. The data distribution device 104, in certain embodiments may include additional data bands and/or channels at about greater than 750 MHz, at about greater than 870 MHz, or at about greater than 1 GHz depending on the frequency bands in use by the legacy CATV upstream and downstream trunks.

FIG. 4 is a conceptual block diagram of a data distribution device 104 capable of transmitting and receiving RF modulated data signals in bands A-D and the legacy cable TV bands shown in FIG. 3 according to an illustrative embodiment of the invention. The data distribution device 104, in this illustrative embodiment, includes a CATV upstream trunk and/or connection (4-1), power filter (4-2), diplexer filter (4-3), CATV downstream and/or cable user trunk (4-4), combiner/splitter (4-5), channel A filter (4-6), channel B filter (4-7), optional channel C filter (4-8), and optional channel D filter (4-9).

The data distribution device 104 may employ a single entry point for CATV (4-1,5-1) to allow ingress/egress of CATV signals and plant power. The entry point may utilize a standard coaxial cable (COAX) interface 'F-type' connection. The connection may be accomplished through a point connection to a passive tape on the main COAX trunk. The CATV signal may be separated from the power at an AC low pass Power filter point (4-2, 5-2). The power signal may be forwarded to the data distribution device 104 power converter while the CATV signal channels are directed to end user ports and associated filters.

In certain embodiments, mixed data CATV pathways (e.g., multimedia at multiple bands), for each of the users, may be accomplished at the user drop points (2-13, 4-4,5-5). Also, data-only pathways may be available on the user drops, Ethernet wireless (2-7, 2-8) and RJ45 ports (2-16). The data distribution device 104 may combine CATV, in a standard and/or legacy or first frequency band, and data transport signals, in a second frequency band, using band pass diplex filters and channel filters along with splitter/combiner circuits. The legacy or first frequency band may be located in a range equal to or less than about 1000 MHz, which is generally the standard CATV video range. The second frequency band may be located in a range greater than the first band. Further, the data distribution device 104 may include additional data signals in additional frequency bands. The additional frequency bands may be located in a range greater than about 750 MHz, but in ranges and/or bands that are different than the second frequency band and each other. The data distribution device 104 may communicate in at least one of half-duplex and collision detection mode. In this instance, the first and second frequency bands may substantially be the same and/or overlapping, but separated in time, e.g., time division multiplexed.

FIG. 4 shows an exemplary filter topology where the incoming cable CATV RF signal and power enters the port at (4-1, 5-1). The signal may then be filtered to remove the 50/60 Hz AC power component at the power filter (4-2). The power component may then be forwarded to a power converter in the device 104. The RF signals from 5 MHz to 860 MHz or 1 GHz may then be directed (unmodified through the filter) to the diplexer filter (4-3). The diplexer filter, in certain embodiments, allows the signals to pass onto the user drop (4-4) unmodified. The diplexer may be a complex filter that allows two separated bands (frequency ranges) to pass to and/or from a user port without interfering with each other. In this instance, the bands may be the CATV Band (5 MHz-870 MHz) and a second data band (908 MHz-2.4 GHz).

The data band signals may be directed to and/or from the diplexer using a multi-channel splitter/combiner (4-5), which merges and/or splits the independent transmit and receive channel signals. These channels are directed to and/or from narrow frequency tuned filters (4-6, 4-7) that may then be forwarded/sourced to and/or from their respective receive (4-6) and/or transmit pathways (4-7). The data distribution device 104 may optionally employ additional data channels utilizing receive and transmit filters (4-8, 4-9). The splitter, in certain embodiments, effectively divides and/or merges the legacy CATV signals in a first band with signals in a second band while incurring minimum losses, but does no filtering.

FIG. 5 is another conceptual block diagram of a data distribution device 104 including a combiner/splitter, legacy cable transceiver, and converter elements according to an illustrative embodiment of the invention.

The FIG. 5 diagram starts with the FIG. 4 electronics (5-1 to 5-6) having a receive data signal directed from the RF section and receive filter (4-6, 5-6) to the tuner stage (5-7). In one embodiment, the tuner detects the correct incoming frequency and power and separates out the intermediate frequency (IF) of the signal from the RF carrier frequency. The IF signal may then be forwarded to the receive demodulator (5-8) which separates the signal into constituent phase and amplitude components.

The data distribution device 104 may employ a converter element and/or data packet interface (5-9, 5-10, 5-11, 5-16, 5-17, 5-18) that includes one or more transmit/receive FIFOs, scrambler/descramblers, and framer circuits to convert the RF modulated signals into data packets and data packet into RF modulated signals. These components are then processed in the frame recovery (5-9) electronics, which further processes these components into clock, framing and data subsets. The data distribution device 104 may strip the framing and clocking data from the signals and forward the resulting data to the data recovery (5-10) electronics, which unscrambles the stream into usable data and packets. These packets may then be forwarded to the FIFO (5-11). The FIFO may be used to synchronize data between the transmission layer timing and the packet processing layer timing. The data may then be moved through the FIFO to the Packet Switch for transport layer processing to one or more of the other ports in the device.

In certain embodiments, the transmission path may be a mirror image of the receive path. Data may be moved from the packet switch, which determines exactly which packets will be forwarded to this drop from the other ports. Data may enter the transmit FIFO (5-18), where it is synchronized to the transmission path electronics clock and timing. The data may then be forwarded to a "scrambler" (5-17), which processes and re-maps data bits to optimize bit transitions for RF transmission. The scrambled data may then be forwarded to an RF framer (5-16), which adds RF transport indices and synchronization to the data packets. The framed data may then be forwarded to the modulation engine (5-14), which maps the sequenced frame and data to RF signal components (phase and amplitude). The signal may be forwarded as an IF signal, which is then added as a component of a high frequency carrier for transmission (5-13). Noise may be removed from the signal at the transmit filter (5-12). The signal may then be forwarded to the combiner/splitter (5-4) where it is merged and forwarded to the diplexer (5-3) and on to the transport drop cable (5-5).

The receive de-modulator (5-8) may demodulate the RF modulated signal in the form of QPSK, QAM, and like modulation structures. The transmit modulator (5-15) may modulate the digital data from the converter and/or digital packet interface in an RF modulated signal based on QPSK, QAM, and like modulated signal structures. An amplifier up converter (5-13) and VCXO (5-14) may deliver the RF modulated signal to the transmit filter (5-12).

In certain embodiments, there are RJ45 ports available on the device 104 to support 10/100/1000 BaseT drops. These ports may be connected directly to the packet switch using standard protocol Media Access Layer (MAC) and Physical Layer (PHY) electronics as defined by IEEE 802.11x specifications In other embodiments, the data distribution device 104 may include wireless ports available, which support any of the standard wireless technology such as, without limitation, the 802.X wireless standards. Other wireless technologies may include cellular/PCS wireless standards such as CDMA, GSM, and CDPD; Pager standards; public wide area network standards, personal area networks such as Bluetooth, and other like wireless technologies. These ports may be embedded in the device 104 and attach directly or indirectly to the Packet Switch Returning to FIG. 2, the exemplary hardware architecture of a data distribution device 104 may include two major digital control blocks: the Embedded Services Micro-controller (2-4) and the packet switching electronics (2-3).

The Embedded Services Micro-controller and/or processor (2-4), in certain embodiments, includes software and/or firmware that may be used to control the local environment and/or used for diagnostics and management of the internal electronics of the device 104. The micro-controller may communicate to a system administrator through the trunk or and properly secured user drop. The administrator may have the capability to diagnose, provision, monitor and police all ports from the control interface. The micro-controller may include RAM (2-5) and ROM (2-6) for proper operation and storage.

Because, in certain embodiments, all packet data may pass through the Packet Switching Electronics (2-3). There may be a number of possible port interfaces available in this section. Any port may act as a trunk or drop port. Each port may be provisioned as such at "power-up" of the device 104. A trunk port may allow all packet traffic to pass with minor controls or regulation.

A drop port may be a port that is specifically provisioned and controlled as an end user or network edge and/or interface. The primary terrestrial trunk may be the fiber-optic ports, which can be configured as upstream, downstream or mesh. An upstream port may be defined as connecting to the head-end digital network. A downstream port may be defined as a port that expands the network edge or user connectivity. A mesh port may be a redundancy path that provides functionality as both upstream and downstream functions depending on network topology. All traffic management may be limited to the capabilities of the Packet Switch Electronics. In certain embodiments, substantial management communications may be limited to Layer 2 or Layer 3 communications.

FIG. 6 is a conceptual block diagram of a data distribution device 104 showing the various packet data flows according to an illustrative embodiment of the invention. In the illustrative diagram n coaxial ports are shown and more than two fiber optic ports are indicated. In certain embodiments, user data from the packet switch may be re-formatted and modulated and/or demodulated in the drop electronics.

In one embodiment, all trunk data may enter the device 104 through the fiber FO ports (6-1, 6-6). Local traffic may flow between users ports (6-3, 6-4, 6-5) if desired to reduce trunk traffic. All traffic may be buffered and switched with the Packet Switch (6-2). The packet switch and the associated Micro-controller (2-4) may maintain and control all packet flow between users and the trunk. In certain embodiments, CATV RF may only be available to users on COAX ports.

FIG. 7 is a conceptual block diagram of a broadband fiber optic data port of a data distribution device according to an illustrative embodiment of the invention. As shown in FIG. 7, a fiber optic port may connect with the packet switch of a data distribution device 104 via a fiber optic transceiver and physical layer interface.

FIG. 8 is a conceptual block diagram of a wireless data port of a data distribution device according to an illustrative embodiment of the invention. As shown in FIG. 8, a wireless data port may connect with the packet switch of a data distribution device 104 via a wireless transceiver and physical layer interface, such as a PCI bus interface.

FIG. 9 is a conceptual block diagram of a Ethernet data port of a data distribution device according to an illustrative embodiment of the invention. As shown in FIG. 9, an Ethernet RJ45 data port may connect with the packet switch of a data distribution device 104 via a physical layer interface.

FIG. 10 is a perspective view of a data distribution device 104 according to an illustrative embodiment of the invention.

In one embodiment, a method of transmitting data over multiple networks is employed using a plurality of data distribution devices 104. The method may include sending to a data distribution device 104, over a first network 114, a first legacy data signal; sending to a data distribution device 104, over a second network 114, a first broadband data signal; receiving at the data distribution device 104 the legacy data signal and the broadband data signal; determining the intended destination of the legacy and broadband data signals; and then sending, from the data distribution device 104, at least one of the data signals to at least one destination device 108 via at least one of the first and second networks.

The destination device may be at least one of a data distribution device 104, a switch, a router, a repeater, or an end user device 108. The method, in certain embodiments, may include switching and converting the first broadband data signal into at least a second legacy data signal. The method may include sending the first legacy data signal in a first frequency band and the second legacy data signal in a second frequency band over the first network 114 to the destination device. The method may include converting and switching the first legacy data signal into at least a second broadband data signal. The method may include sending, from the data distribution device 104, the first broadband data signal to the destination device, e.g., another data distribution device 104, via the second data network 112 and sending the first legacy data signal to the destination device via the first data network 114.

In another embodiment, a communications system 100 may include a plurality of data distribution devices 104. The system 100 may include a legacy data network 114, a plurality of end user devices 108 in communication with the legacy data network 114, and a broadband data network 112. The plurality of data distribution devices 104 may be communication with the legacy and broadband data networks to enable enhanced data communications from a service provider to end user device 108.

Each data distribution device 104 may include a processor in communication with a data switch and configured to determine the distribution of at least one data packet to at least on data port. Each device 104 may includes at least one wireless transceiver, in communication with the data switch and at least one wireless data port, for sending and receiving wireless data signals.

At least one end user device 108 may be configured to exchange wireless data with at least one data distribution device 104 via a wireless data port 120. At least one end user device 108 may be configured to exchange RF modulated data signals with at least one data distribution device 104 via at least one legacy data port. At least one data distribution device 104 may be configured to exchange RF modulated data signals with at least one other data distribution device 104 via at least one other legacy data port.

At least a portion of the plurality of data distribution devices 104 may be connected via one or more data ports with each other in a series configuration. At least a portion of the plurality of data distribution devices 104 may be connected via one or more data ports with each other in a mesh configuration. The RF modulated data signal may include at least one of an analog data signal and a digital data signal. The first frequency band may be located in a range greater than about 750 MHz, 870 MHz, or 1000 MHz. The second frequency band may be located in a range greater than about 750 MHz, 870 MHz, or 1000 MHz. The second frequency band may be located in a range different than the first frequency band.

The combiner/splitter of at least one data distribution device 104 may be configured to combine a third RF modulated data signal with the first and second RF modulated data signals. The third RF modulated data signal may be in a third frequency band. The third frequency band may be located in a range equal to or less than about 1000 MHz.

The legacy data network may include a coaxial cable network. The legacy data network may include at least a portion of the PSTN. The portion of the PSTN may support and/or enable a data transmission protocol including at least one of DSL, ADSL, VDSL, or VDSL2. The broadband data network may include a fiber optic physical medium 112.

What is claimed is:

1. A data distribution device comprising,
    at least one legacy user data port in communication with at least one end user device via a first network transport medium,
    at least one broadband data port in communication with a second network transport medium,
    at least one data port in communication with a legacy network via a third network transport medium,
    at least one broadband transceiver, in communication with the at least one broadband data port, for sending and receiving broadband data signals,
    at least one legacy transceiver, in communication with the at least one legacy user data port and the at least one data port, for sending and receiving RF modulated data signals,
    at least one converter, in communication with the at least one legacy transceiver, adapted for i) converting RF modulated data signals into data packets and ii) converting data packets into RF modulated data signals,
    a data switch, in communications with the at least one converter and the at least one broadband transceiver, for inspecting and routing data packets between data ports, and
    at least one combiner/splitter, in communication with the at least one legacy transceiver, adapted for i) combining a first RF modulated data signal in a first frequency band with a second RF modulated data signal in a second frequency band and ii) extracting at least one of the first and second RF modulated data signals from a single RF modulated data signal including the combined RF modulated data signals in the first and second frequency bands;
    wherein data from both the second transport network medium and the third transport network medium is transported over the first transport medium, and wherein the first transport medium and the third network transport medium comprise coaxial cable forming part of a legacy cable television network and the second network transport medium comprising optical cable forming part of a broadband data network, the legacy cable television network and the broadband data network operating in parallel and the data distribution device configured to merge traffic associated with each of the legacy cable television network and the broadband data network to an end user via the first transport medium.

2. The device of claim 1 comprising: a processor, in communication with the data switch, configured to determine the distribution of at least one data packet to at least on data port.

3. The device of claim 1 comprising: at least one wireless transceiver, in communication with the data switch and at least one wireless data port, for sending and receiving wireless data signals.

4. The device of claim 1, wherein the RF modulated data signal includes at least one of an analog data signal and a digital data signal.

5. The device of claim 1, wherein the first frequency band is located in a range greater than about 750 MHz, and wherein the first frequency band is outside a deployed cable television band on the first network transport medium.

6. The device of claim 5, wherein the second frequency band is located in a range greater than about 750 MHz, the second frequency band being located in a range different than the first frequency band, and wherein the second frequency band is outside a deployed cable television band.

7. The device of claim 1, wherein the combiner/splitter is configured to combine a third RF modulated data signal with the first and second RF modulated data signals, the third RF modulated data signal being in a third frequency band.

8. The device of claim 7, wherein the third frequency band is located in a range equal to or less than about 1000 MHz, and wherein the third frequency band is outside a deployed cable television band.

9. The device of claim 1, wherein the data switch is configured to send one or more data packets not addressed to any of the legacy data ports to another data distribution device via the at least one broadband data port.

10. The device of claim 1, wherein the inspecting and routing of data packets includes at least one of a packet prioritization and quality of service determination.

11. The device of claim 1, wherein the inspecting and routing of data packets is based at least in part on one of the IEEE 802.1p, IEEE 802.1q, and the Multi-Protocol Label Switching (MPLS) standard.

12. The device of claim 1, wherein the device communicates in at least one of half-duplex and collision detection mode.

13. The device of claim 12, wherein the first and second frequency bands are at least one of substantially the same and overlapping.

14. The device of claim 1 comprising, one or more additional Ethernet data ports.

15. The device of claim 1, wherein the processor is configured to communicate with a remote server for determining the distribution of data to at least one data port.

16. The device of claim 15, wherein the processor is configured to i) store local configuration information, ii) monitor and store internal operations information, and iii) report operations information to the remote server.

17. The device of claim 1, wherein the at least one legacy user data port includes a coaxial cable port.

18. The device of claim 1, wherein the at least one legacy user data port includes a digital subscriber line data port.

19. The device of claim 1, wherein the broadband data port includes a fiber optic data port.

20. A communications system comprising:
a legacy data network,
a plurality of end user devices in communication with the legacy data network,
a broadband data network operating in parallel with the legacy data network, and
a plurality of data distribution devices in communication with the legacy and broadband data networks, each of the plurality of data distribution configured to merge data traffic from the legacy data network and the broadband data network for distribution to the plurality of end users, and each of the plurality of data distribution devices including:
at least one legacy user data port in communication with at least one end user device,
at least one data port in communication with the legacy data network,
at least one broadband data port,
at least one broadband transceiver, in communication with the at least one broadband data port, for sending and receiving broadband data signals,
at least one legacy transceiver, in communication with the at least one legacy user data port and the at least one data port, for sending and receiving RF modulated data signals,
at least one converter, in communication with the at least one legacy transceiver, adapted for i) converting RF modulated data signals into data packets and ii) converting data packets into RF modulated data signals, a data switch, in communications with the at least one converter and the at least one broadband transceiver, for inspecting and routing data packets between data ports, and
at least one combiner/splitter, in communication with the at least one legacy transceiver, adapted for i) combining a first RF modulated data signal in a first frequency band with a second RF modulated data signal in a second frequency band and ii) extracting at least one of the first and second RF modulated data signals from a single RF modulated data signal including the combined RF modulated data signals in the first and second frequency bands;
wherein data from both the legacy data network and the broadband data network is distributed over a coaxial cable forming part of a legacy cable television network to the at least one end user device.

21. The system of claim 20, wherein each device includes a processor in communication with the data switch and configured to determine the distribution of at least one data packet to at least on data port.

22. The system of claim 20, wherein each device includes at least one wireless transceiver, in communication with the data switch and at least one wireless data port, for sending and receiving wireless data signals.

23. The system of claim 22 comprising: at least one end user device configured to exchange wireless data with at least one data distribution device via the wireless data port.

24. The system of claim 20, wherein at least one end user device configured to exchange RF modulated data signals with at least one data distribution device via at least one legacy data port.

25. The system of claim 20, wherein at least one data distribution device is configured to exchange RF modulated data signals with at least one other data distribution device via at least one other legacy data port.

26. The system of claim 20, wherein at least a portion of the plurality of data distribution devices are connected via one or more data ports with each other in a series configuration.

27. The system of claim 20, wherein at least a portion of the plurality of data distribution devices are connected via one or more data ports with each other in a mesh configuration.

28. The system of claim 20, wherein the RF modulated data signal includes at least one of an analog data signal and a digital data signal.

29. The system of claim 20, wherein the first frequency band is located in a range greater than about 750 MHz, and wherein the first frequency band is outside a deployed cable television band on the cable.

30. The system of claim 29, wherein the second frequency band is located in a range greater than about 750 MHz, the second frequency band being located in a range different than the first frequency band, and wherein the second frequency band is outside a deployed cable television band.

31. The system of claim 20, wherein the combiner/splitter of at least one data distribution device is configured to combine a third RF modulated data signal with the first and second RF modulated data signals, the third RF modulated data signal being in a third frequency band.

32. The device of claim 31, wherein the third frequency band is located in a range equal to or less than about 1000 MHz, and wherein the third frequency band is outside a deployed cable television band.

33. The system of claim 20, wherein the legacy data network includes a coaxial cable network.

34. The system of claim 20, wherein the legacy data network includes at least a portion of the Public Switched Telephone Network, PSTN.

35. The system of claim 34, wherein the portion of the PSTN supports a data transmission protocol including at least one of Digital Subscriber Loop (DSL), Asymmetric Digital Subscriber Line (ADSL), Very High Bitrate Digital Subscriber Line (VDSL), and Very High Speed Digital Subscriber Line 2 (VDSL2).

36. The system of claim 20, wherein the broadband data network includes a fiber optic physical medium.

37. A method of transmitting data over multiple networks comprising:
sending a first legacy data signal to a data distribution device over a first network, wherein the data distribution device is connected to a coaxial cable forming part of a legacy cable television network and,
sending a first broadband data signal to the data distribution device over a second network, wherein the first network and the second network operating in parallel to one another,
receiving at the data distribution device the legacy data signal and the broadband data signal,
processing at the data distribution device the broadband data signal with a data switch,
sending, from the data distribution device, processed data and data from the first legacy data signal to at least one destination device over a legacy network connection between the data distribution device and the destination device, wherein the processed data is transmitted out-of-band on the legacy network connection, and wherein the data distribution device is configured to merge data traffic from the first network and the second network to the at least one destination device.

38. The method of claim 37, wherein the destination device is at least one of a data distribution device, a switch, a router, a repeater, and an end user device.

39. The method of claim 37 comprising: switching and converting the first broadband data signal into at least a second legacy data signal.

40. The method of claim 37 comprising: converting and switching the first legacy data signal into at least a second broadband data signal.

41. The method of claim 38 comprising: sending, from the data distribution device, the first broadband data signal to the destination device via the second data network and sending the first legacy data signal to the destination device via the first data network.

42. The method of claim 39 comprising: sending the first legacy data signal in a first frequency band and the second legacy data signal in a second frequency band over the first network to the destination device, wherein the first frequency band and the second frequency band are outside a deployed cable television band.

* * * * *